US012696090B2

(12) United States Patent
Mukaiyama et al.

(10) Patent No.: US 12,696,090 B2
(45) Date of Patent: Jul. 28, 2026

(54) ACCESS-CONTROL-PURPOSE SYSTEM, COMMUNICATION SYSTEM, ACCESS CONTROL METHOD, AND PROGRAM

(71) Applicant: NTT, Inc., Tokyo (JP)

(72) Inventors: Akio Mukaiyama, Tokyo (JP); Tetsushi Morita, Tokyo (JP); Akira Nagai, Tokyo (JP)

(73) Assignee: NTT, Inc., Tokyo (JP)

( * ) Notice: Subject to any disclaimer, the term of this patent is extended or adjusted under 35 U.S.C. 154(b) by 231 days.

(21) Appl. No.: 18/730,140

(22) PCT Filed: Feb. 2, 2022

(86) PCT No.: PCT/JP2022/004095
§ 371 (c)(1),
(2) Date: Jul. 18, 2024

(87) PCT Pub. No.: WO2023/148853
PCT Pub. Date: Aug. 10, 2023

(65) Prior Publication Data
US 2025/0106632 A1 Mar. 27, 2025

(51) Int. Cl.
*H04W 12/08* (2021.01)
*H04W 12/041* (2021.01)
*H04W 12/06* (2021.01)

(52) U.S. Cl.
CPC ......... *H04W 12/08* (2013.01); *H04W 12/041* (2021.01); *H04W 12/06* (2013.01)

(58) Field of Classification Search
CPC ... H04W 12/08; H04W 12/041; H04W 12/06; H04L 9/32
See application file for complete search history.

(56) References Cited

FOREIGN PATENT DOCUMENTS

| JP | 2019198052 A | * | 11/2019 | |
| JP | 2020533835 A | * | 11/2020 | ........... H04L 9/3231 |

OTHER PUBLICATIONS

Atsushi Fujioka, Fumitaka Hoshino et al., "id-eCK Secure id-Based Authenticated Key Exchange on Symmetric and Asymmetric Pairing", IEICE Trans. Fundamentals, vol. E96-A, No. 6 Jun. 2013, Communications and Computer Sciences, pp. 1139-1155.

* cited by examiner

*Primary Examiner* — Wesley L Kim
(74) *Attorney, Agent, or Firm* — IPUSA, PLLC

(57) ABSTRACT
An access-control-purpose system that provides access information to first and second communication devices that perform mutual authentication using ID-based encryption creates an access secret key by generating a hash value of a logical sum of a character string based on the access information and a master secret key, creates first authentication data by generating a hash value of a first authentication ID for the first communication device by using a first hash function, creates second authentication data by generating a hash value of a second authentication ID for the second communication device by using a second hash function, creates access confirmation data configured by a product of the access secret key and a generation source of a subgroup in a group on a first elliptic curve and a product of the access secret key and a generation source of a subgroup in a group on a second elliptic curve, transmits the first authentication data and the access confirmation data to the first communication device, and transmits the second authentication data and the access confirmation data to the second communication device.

7 Claims, 11 Drawing Sheets

Figure 2:
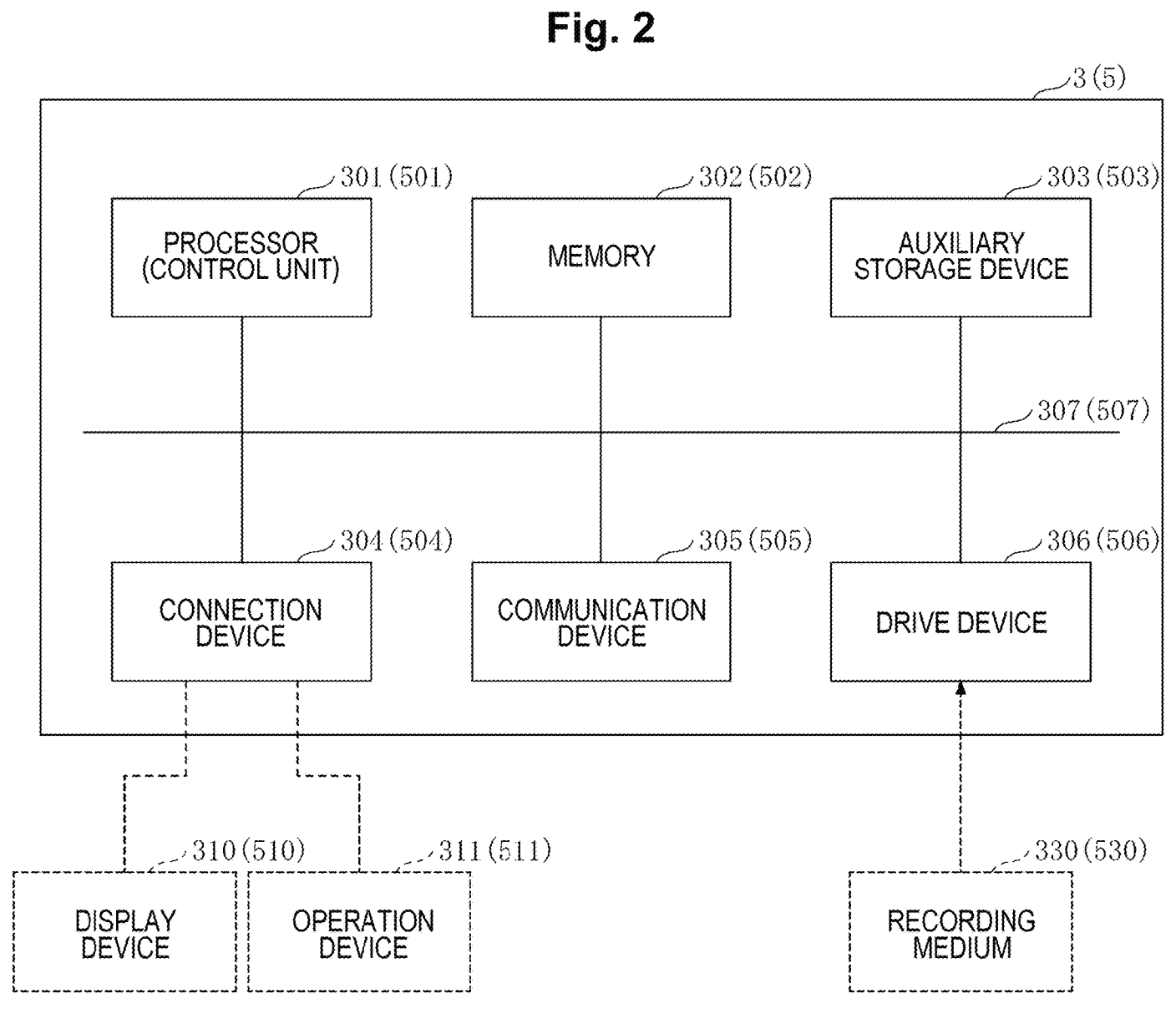

301 (501)
PROCESSOR
(CONTROL UNIT)

302 (502)
MEMORY 303 (503)
AUXILIARY
STORAGE DEVICE 304 (504)
CONNECTION
DEVICE 305 (505)
COMMUNICATION
DEVICE 306 (506)
DRIVE DEVICE 307 (507)

310 (510)
DISPLAY
DEVICE 311 (511)
OPERATION
DEVICE 330 (530)
RECORDING
MEDIUM

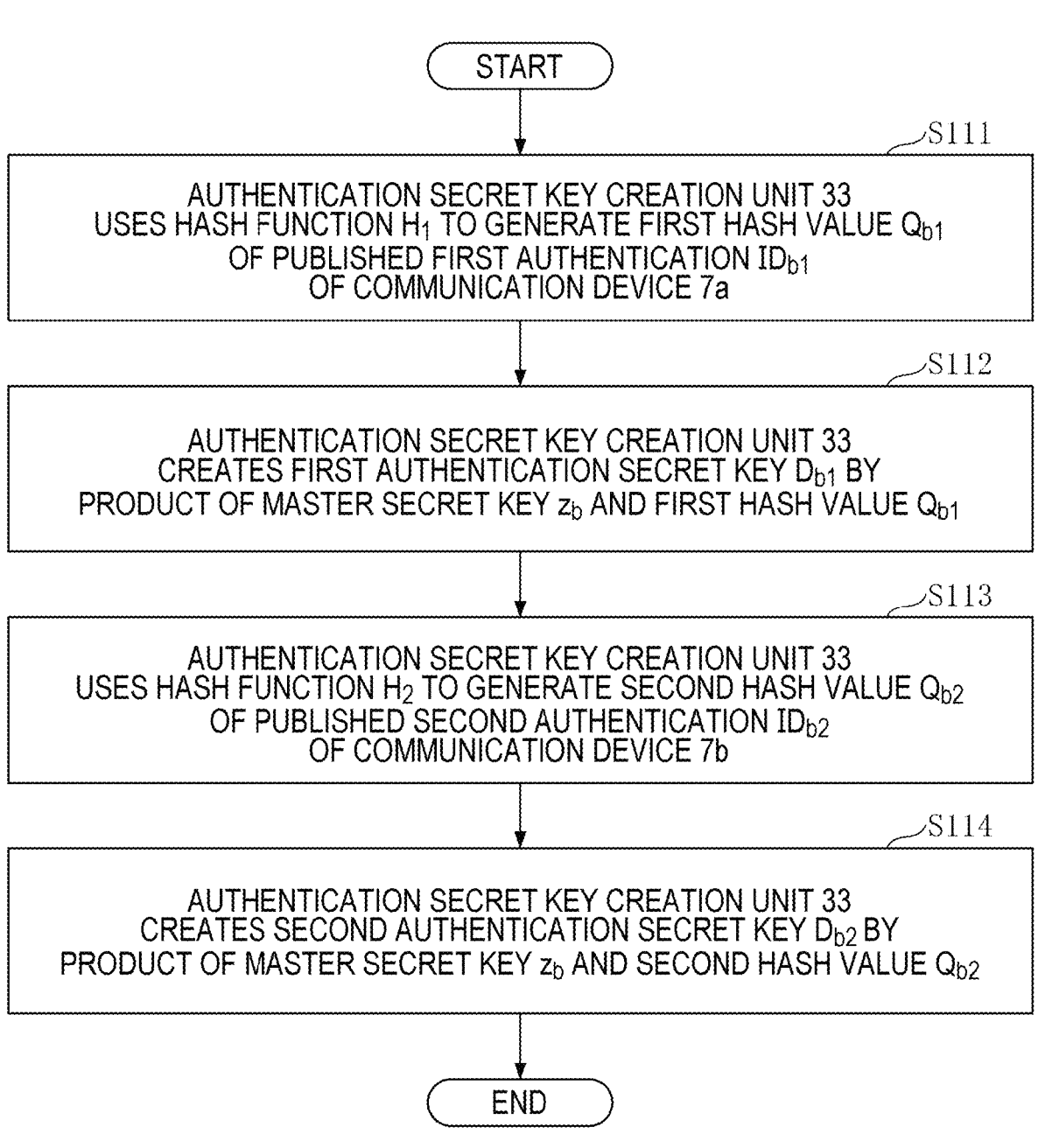

START

S111

AUTHENTICATION SECRET KEY CREATION UNIT 33
USES HASH FUNCTION $H_1$ TO GENERATE FIRST HASH VALUE $Q_{b1}$
OF PUBLISHED FIRST AUTHENTICATION $ID_{b1}$
OF COMMUNICATION DEVICE 7a

S112

AUTHENTICATION SECRET KEY CREATION UNIT 33
CREATES FIRST AUTHENTICATION SECRET KEY $D_{b1}$ BY
PRODUCT OF MASTER SECRET KEY $z_b$ AND FIRST HASH VALUE $Q_{b1}$

S113

AUTHENTICATION SECRET KEY CREATION UNIT 33
USES HASH FUNCTION $H_2$ TO GENERATE SECOND HASH VALUE $Q_{b2}$
OF PUBLISHED SECOND AUTHENTICATION $ID_{b2}$
OF COMMUNICATION DEVICE 7b

S114

AUTHENTICATION SECRET KEY CREATION UNIT 33
CREATES SECOND AUTHENTICATION SECRET KEY $D_{b2}$ BY
PRODUCT OF MASTER SECRET KEY $z_b$ AND SECOND HASH VALUE $Q_{b2}$

END

Fig. 8

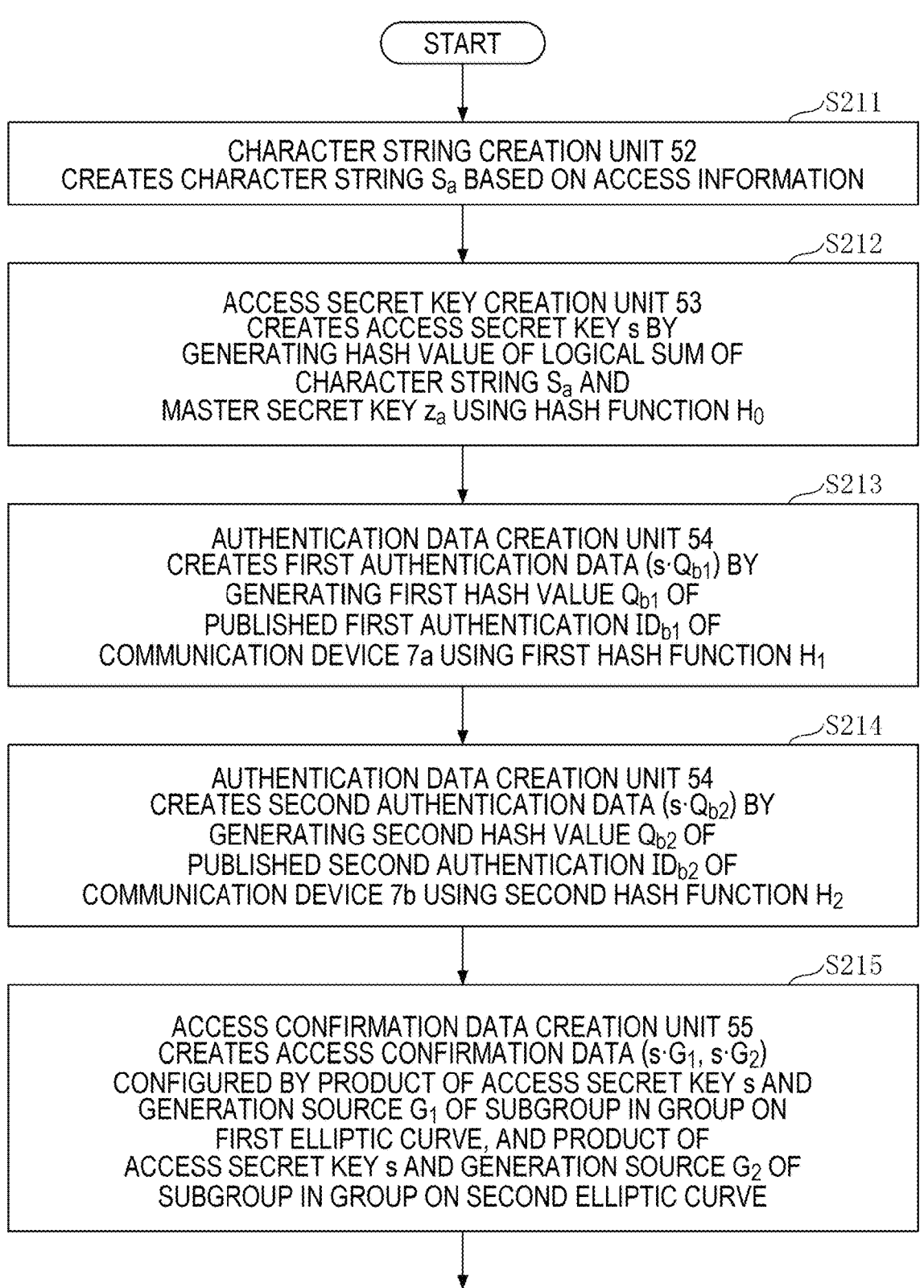

START

S211

CHARACTER STRING CREATION UNIT 52
CREATES CHARACTER STRING $S_a$ BASED ON ACCESS INFORMATION

S212

ACCESS SECRET KEY CREATION UNIT 53
CREATES ACCESS SECRET KEY s BY
GENERATING HASH VALUE OF LOGICAL SUM OF
CHARACTER STRING $S_a$ AND
MASTER SECRET KEY $z_a$ USING HASH FUNCTION $H_0$

S213

AUTHENTICATION DATA CREATION UNIT 54
CREATES FIRST AUTHENTICATION DATA $(s \cdot Q_{b1})$ BY
GENERATING FIRST HASH VALUE $Q_{b1}$ OF
PUBLISHED FIRST AUTHENTICATION $ID_{b1}$ OF
COMMUNICATION DEVICE 7a USING FIRST HASH FUNCTION $H_1$

S214

AUTHENTICATION DATA CREATION UNIT 54
CREATES SECOND AUTHENTICATION DATA $(s \cdot Q_{b2})$ BY
GENERATING SECOND HASH VALUE $Q_{b2}$ OF
PUBLISHED SECOND AUTHENTICATION $ID_{b2}$ OF
COMMUNICATION DEVICE 7b USING SECOND HASH FUNCTION $H_2$

S215

ACCESS CONFIRMATION DATA CREATION UNIT 55
CREATES ACCESS CONFIRMATION DATA $(s \cdot G_1, s \cdot G_2)$
CONFIGURED BY PRODUCT OF ACCESS SECRET KEY s AND
GENERATION SOURCE $G_1$ OF SUBGROUP IN GROUP ON
FIRST ELLIPTIC CURVE, AND PRODUCT OF
ACCESS SECRET KEY s AND GENERATION SOURCE $G_2$ OF
SUBGROUP IN GROUP ON SECOND ELLIPTIC CURVE

END

$$x_A \in_R Z_q \qquad\qquad x_B \in_R Z_q$$
$$X_{A,1} = x_A G_1 \qquad\qquad X_{B,1} = x_B G_1$$
$$X_{A,2} = x_A G_2 \qquad\qquad X_{B,2} = x_B G_2$$

$\xrightarrow{\ ID_A, X_{A,1}, X_{A,2}\ }$ $\xleftarrow{\ ID_B, X_{B,1}, X_{B,2}\ }$ Verify $X_{B,1}$ and $X_{B,2}$ are on the curve Verify $e(X_{B,1}, G_2) = e(G_1, X_{B,2})$ $$\sigma_1 = e(D_{A,1}, Q_{B,2})$$
$$\sigma_2 = e(D_{A,1} + x_A Z_1, Q_{B,2} + X_{B,2})$$
$$\sigma_3 = x_A X_{B,1}$$
$$\sigma_4 = x_A X_{B,2}$$
$$sid = (ID_A || ID_B || X_{A,1} || X_{A,2} || X_{B,1} || X_{B,2})$$
$$K = H(\sigma_1 || \sigma_2 || \sigma_3 || \sigma_4 || sid)$$

Verify $X_{A,1}$ and $X_{A,2}$ are on the curve

Verify $e(X_{A,1}, G_2) = e(G_1, X_{A,2})$ $$\sigma_1 = e(Q_{A,1}, D_{B,2})$$
$$\sigma_2 = e(Q_{A,1} + X_{A,1}, D_{B,2} + x_B Z_2)$$
$$\sigma_3 = x_B X_{A,1}$$
$$\sigma_4 = x_B X_{A,2}$$
$$sid = (ID_A || ID_B || X_{A,1} || X_{A,2} || X_{B,1} || X_{B,2})$$
$$K = H(\sigma_1 || \sigma_2 || \sigma_3 || \sigma_4 || sid)$$

Fig. 10

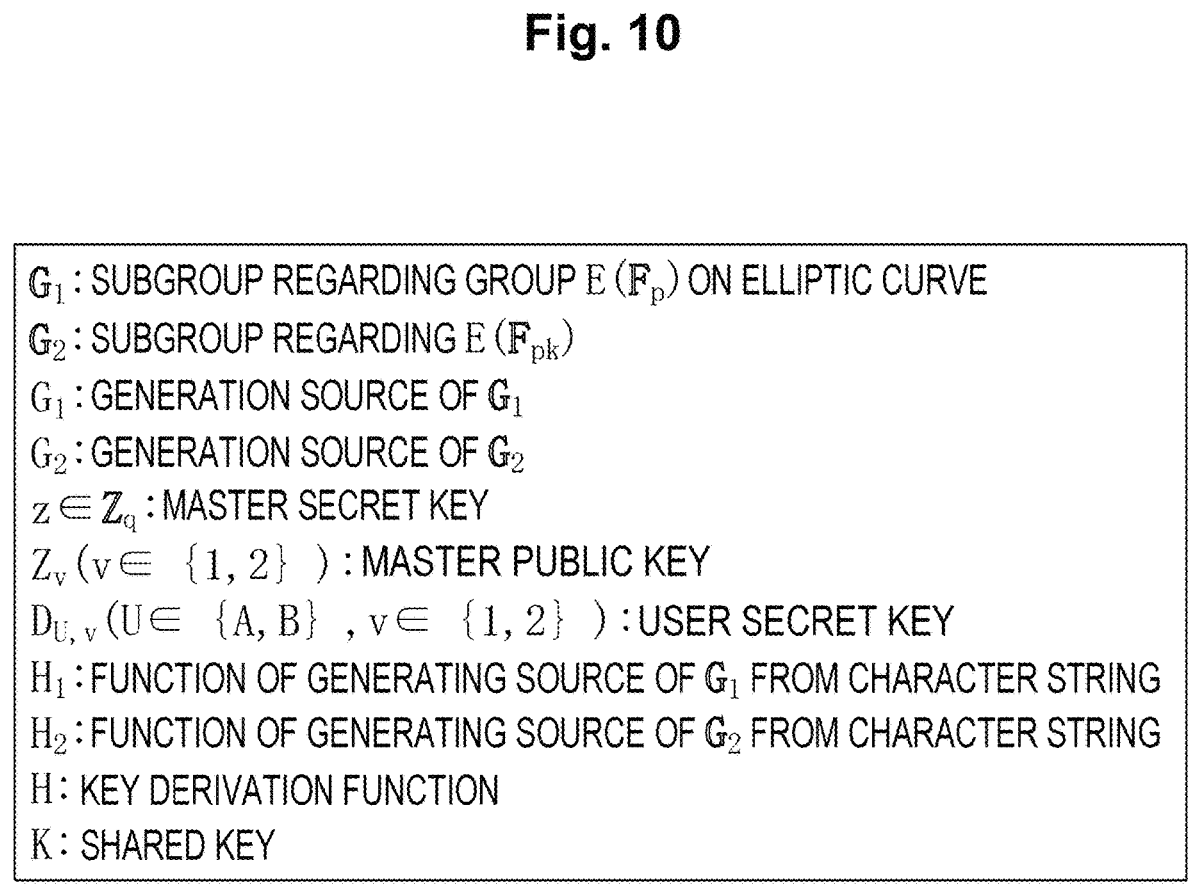

$\mathbb{G}_1$ : SUBGROUP REGARDING GROUP $E\,(\mathbb{F}_p)$ ON ELLIPTIC CURVE $\mathbb{G}_2$ : SUBGROUP REGARDING $E\,(\mathbb{F}_{pk})$ $G_1$ : GENERATION SOURCE OF $\mathbb{G}_1$ $G_2$ : GENERATION SOURCE OF $\mathbb{G}_2$ $z \in \mathbb{Z}_q$ : MASTER SECRET KEY $Z_v\,(v \in \{1, 2\})$ : MASTER PUBLIC KEY $D_{U,\,v}\,(U \in \{A, B\}, v \in \{1, 2\})$ : USER SECRET KEY $H_1$ : FUNCTION OF GENERATING SOURCE OF $\mathbb{G}_1$ FROM CHARACTER STRING $H_2$ : FUNCTION OF GENERATING SOURCE OF $\mathbb{G}_2$ FROM CHARACTER STRING $H$ : KEY DERIVATION FUNCTION $K$ : SHARED KEY

Fig. 11

● COMMUNICATION DEVICE 7a SIDE $$X_{A,1} = x_A G_1 \qquad\qquad \Rightarrow X_{A,1} = x_A s G_1$$
$$X_{A,2} = x_A G_2 \qquad\qquad \Rightarrow X_{A,2} = x_A s G_2$$
$$\sigma_1 = e(D_{A,1}, Q_{B,2}) \qquad \Rightarrow \sigma_1 = e(D_{A,1}, + s Q_{A,1}, \ Q_{B,2})$$

● COMMUNICATION DEVICE 7b SIDE $$X_{B,1} = x_B G_1 \qquad\qquad \Rightarrow X_{B,1} = x_B s G_1$$
$$X_{B,2} = x_B G_2 \qquad\qquad \Rightarrow X_{B,2} = x_B s G_2$$
$$\sigma_1 = e(Q_{A,1}, D_{B,2}) \qquad \Rightarrow \sigma_1 = e(Q_{A,1}, D_{B,2} + s Q_{B,2})$$

\* s REPRESENTS ACCESS SECRET KEY s $(= H_0 (S_a \ || \ z_a))$

ACCESS-CONTROL-PURPOSE SYSTEM, COMMUNICATION SYSTEM, ACCESS CONTROL METHOD, AND PROGRAM

TECHNICAL FIELD

The present disclosure relates to an access control system (access-control-purpose system), a communication system, an access control method, and a program.

BACKGROUND ART

In recent years, as an encryption technology capable of using an ID (character string) as a public key, an ID-based encryption technology has been studied (see Non Patent Literature 1). Since the ID-based encryption technology can be implemented with a smaller amount of calculation and communication than an encryption technology using a public key infrastructure (PKI), application to systems including Internet of Things (IoT) devices and the like is expected.

CITATION LIST

Non Patent Literature

Non Patent Literature 1: Atsushi Fujioka, Fumitaka Hoshino et al., "id-eCK Secure id-Based Authenticated Key Exchange on Symmetric and Asymmetric Pairing", IEICE TRANSACTIONS on Fundamentals of Electronics, Communications and Computer Sciences Vol. E96-A No. 6 pp. 1139-1155

SUMMARY OF INVENTION

Technical Problem

However, in the conventional ID-based encryption technology, since an ID to be used is published as a public key, in a case where an ID includes information that is not desired to be viewed by a third party, such as a name of an individual, as access information, there is a problem that the ID is published together with the information that is not desired to be viewed.

The present invention has been made in view of the above points, and an object of the present invention is to enable access targets to access each other in a state where access information is concealed in an ID-based encryption technology.

Solution to Problem

In order to achieve the above object, an invention according to claim 1 is an access control system that provides, to first and second communication devices that perform mutual authentication using ID-based encryption, access information of the first and second communication devices, the access control system including: an access secret key creation unit that creates an access secret key by generating a hash value of a logical sum of a character string according to access information and a master secret key; an authentication data creation unit that creates first authentication data by generating a hash value of a first authentication ID for the first communication device by using a first hash function, and creates second authentication data by generating a hash value of a second authentication ID for the second communication device by using a second hash function; an access confirmation data creation unit that creates access confirmation data configured by a product of the access secret key and a generation source of a subgroup in a group on a first elliptic curve, and a product of the access secret key and a generation source of a subgroup in a group on a second elliptic curve; and a transmission unit that transmits the first authentication data and the access confirmation data to the first communication device, and transmits the second authentication data and the access confirmation data to the second communication device.

Advantageous Effects of Invention

As described above, according to the present invention, there is an effect that access targets which are first and second communication devices can access each other in a state where access information is concealed.

BRIEF DESCRIPTION OF DRAWINGS

FIG. 2 is a hardware configuration diagram of a communication data utilization system and an access control system according to the embodiment.

FIG. 3 is a hardware configuration diagram of a communication device according to the embodiment.

FIG. 6 is a flowchart illustrating processing of creating an authentication secret key.

FIG. 8 is a sequence diagram illustrating creation processing of authentication data and access confirmation data.

FIG. 9 is a diagram illustrating a protocol of an FSU.

FIG. 10 is a diagram for explaining each character in FIG. 9.

FIG. 11 is a diagram illustrating change content of a part of the protocol of the FSU of FIG. 9.

DESCRIPTION OF EMBODIMENTS

[Outline of Overall Configuration]

Figure 1:
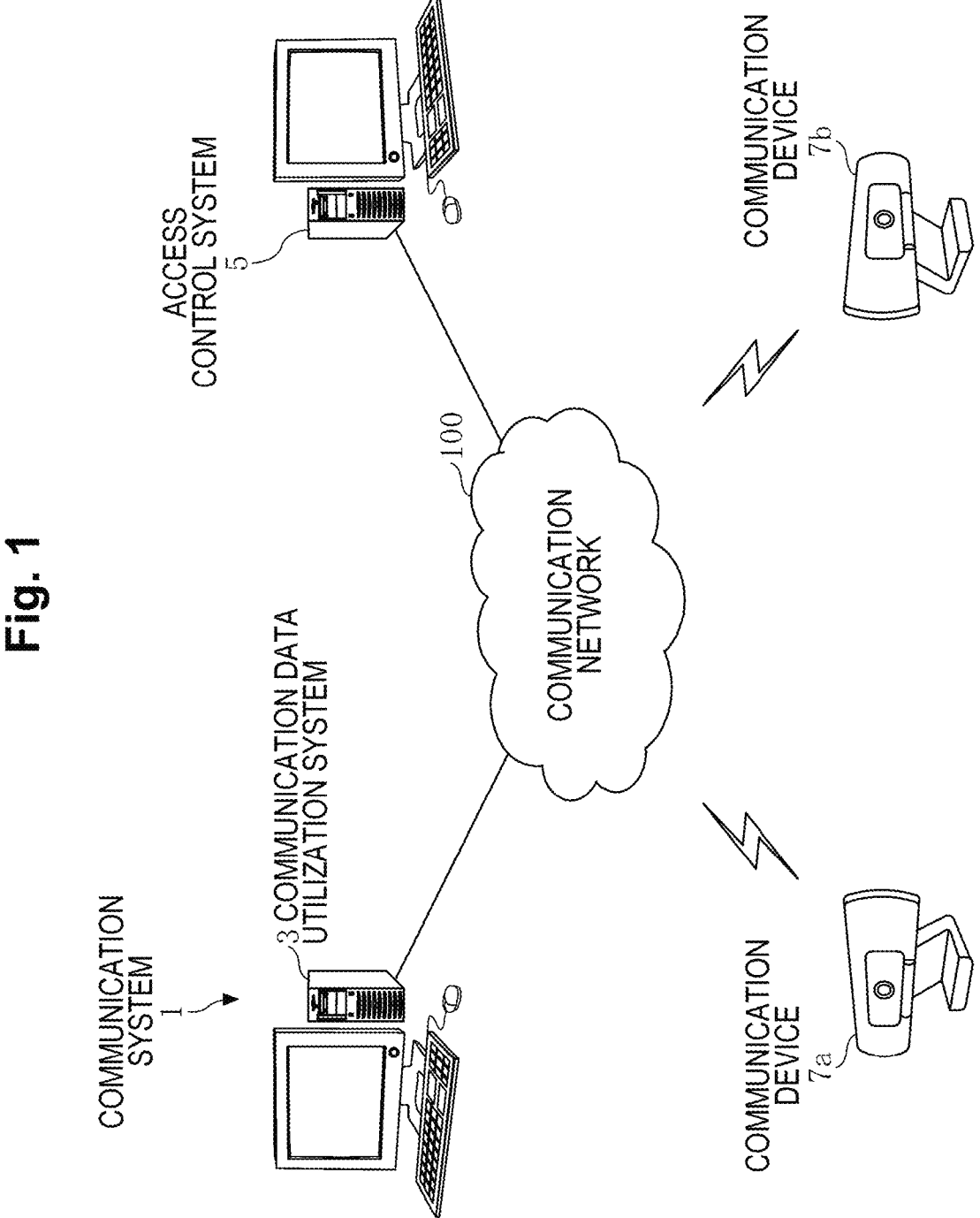
FIG. 1 is a schematic diagram of a communication system according to an embodiment.

FIG. 1 is a schematic diagram of a communication system according to the embodiment of the present invention. As illustrated in FIG. 1, a communication system 1 of the present embodiment is constructed by a communication data utilization system 3, an access control system 5 (access-control-purpose system), and communication devices 7a and 7b. Note that, although two communication devices 7a and 7b are illustrated in FIG. 1, three or more communication devices may be used.

In addition, the communication data utilization system 3, the access control system 5, and the communication devices 7a and 7b can communicate via a communication network 100 such as the Internet. The connection form of the communication network 100 may be either wireless or wired.

The communication data utilization system 3 includes one or a plurality of computers. The "communication data utilization system" may be referred to as a "communication data utilization server".

The communication data utilization system 3 holds a secret master key $z_b$, and creates an authentication secret key $D_{b1}$ and the like using the master key $z_b$ and an authentication ID (identification/identifier) of a public communication device.

The access control system 5 includes one or a plurality of computers. The "access control system" may be referred to as an "access control server".

The access control system 5 holds a secret master key $z_a$, and generates a hash value s from the master key $z_a$ and a character string $S_a$ indicating the access information using a hash function $H_0$ so that the access information including a personal name and the like cannot be recognized by a third party.

The communication devices 7a and 7b are Internet of Things (IoT) devices and the like that perform mutual authentication using ID-based encryption, and examples thereof include web cameras. In a case where the communication device 7a and the communication device 7b are accessed from a PC of a certain user (for example, TARO), the communication devices 7a and 7b can be accessed by using the access information (for example, TARO Webcamera), and further, the mutual authentication and the access permission confirmation can be performed between the communication devices 7a and 7b. Hereinafter, the communication devices 7a and 7b are collectively referred to as a "communication device 7".

[Hardware Configuration]
<Hardware Configuration of Each System>

First, a hardware configuration of the communication data utilization system 3 and the access control system will be described with reference to FIG. 2. FIG. 2 is a hardware configuration diagram of the communication data utilization system 3 and the access control system 5.

As illustrated in FIG. 2, the communication data utilization system 3 includes a processor 301, a memory 302, an auxiliary storage device 303, a connection device 304, a communication device 305, and a drive device 306. Note that the respective pieces of hardware constituting the communication data utilization system 3 are mutually connected via a bus 307.

The processor 301 serves as a control unit that controls the entire communication data utilization system 3, and includes various arithmetic devices such as a central processing unit (CPU). The processor 301 reads various programs on the memory 302 and executes the programs. Note that the processor 301 may include general-purpose computing on graphics processing units (GPGPU).

The memory 302 includes a main storage device such as a read only memory (ROM) and a random access memory (RAM). The processor 301 and the memory 302 configure a so-called computer. The processor 301 executes various programs read on the memory 302, and thus the computer implements various functions.

The auxiliary storage device 303 stores various programs and various types of information used when the various programs are executed by the processor 301.

The connection device 304 is a connection device that connects an external device (for example, a display device 310 or an operation device 311) and the communication data utilization system 3.

The communication device 305 is a communication device for transmitting and receiving various types of information to and from other devices (including devices, servers, and systems).

The drive device 306 is a device for setting a recording medium 330. Examples of the recording medium 330 described here include a medium that optically, electrically, or magnetically records information, such as a compact disc read-only memory (CD-ROM), a flexible disk, or a magneto-optical disk. Further, the recording medium 330 may include a semiconductor memory or the like that electrically records information, such as a read only memory (ROM) or a flash memory.

Note that, for example, in a case where the distributed recording medium 330 is set in the drive device 306 and the various programs recorded in the recording medium 330 are read by the drive device 306, the various programs to be installed in the auxiliary storage device 303 are installed. Alternatively, the various programs to be installed in the auxiliary storage device 303 may be installed by being downloaded from a network via the communication device 305.

In addition, FIG. 2 illustrates a hardware configuration of the access control system 5. Since each configuration is the same except that the reference numerals are changed from $300s$ to $500s$, description thereof will be omitted.

<Hardware Configuration of Communication Device>

Figure 3:
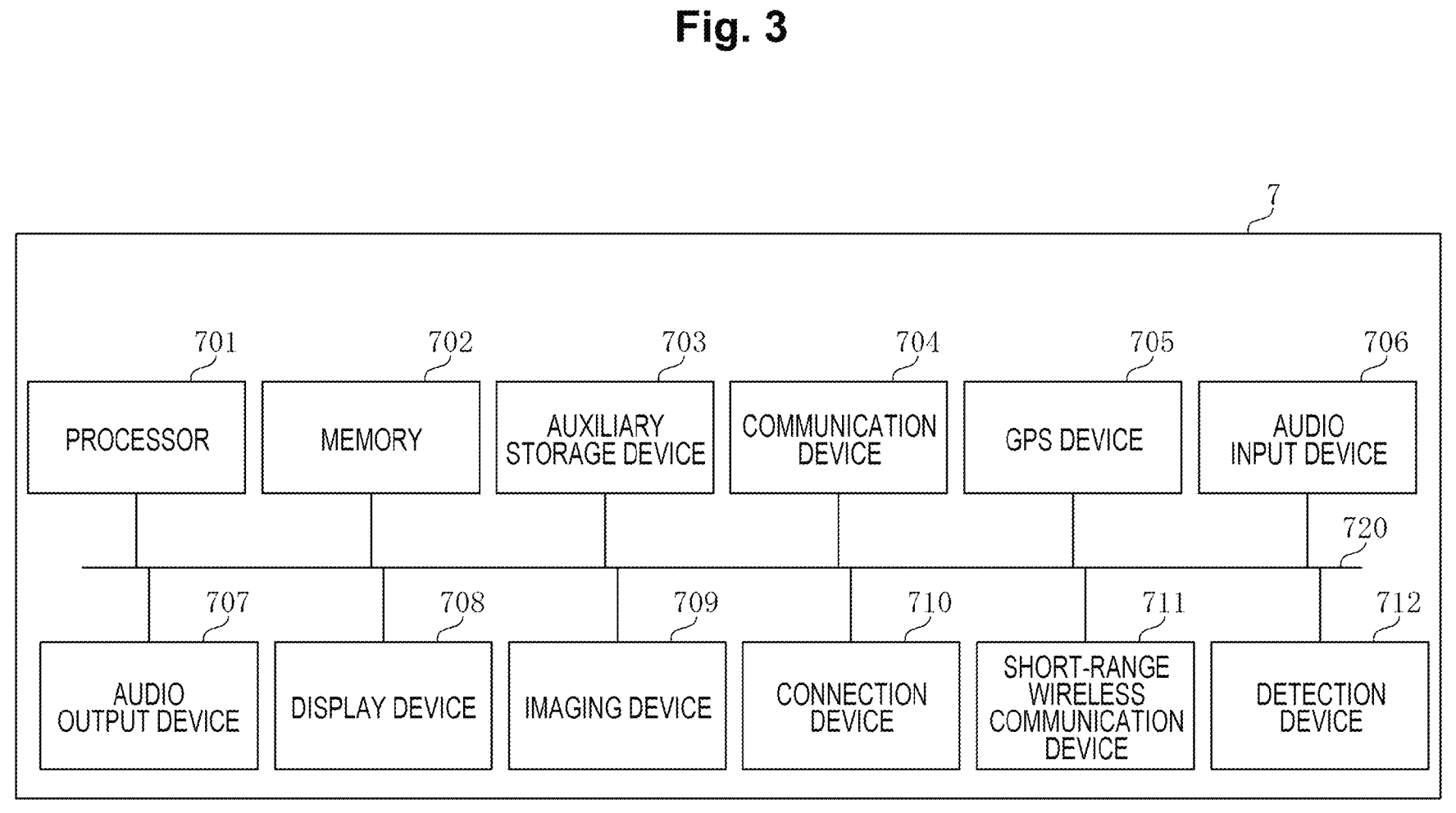

Next, a hardware configuration of the communication device 7 will be described with reference to FIG. 3. FIG. 3 is a hardware configuration diagram of the communication device 7.

As illustrated in FIG. 3, the communication device 7 includes a processor 701, a memory 702, an auxiliary storage device 703, a communication device 704, and a global positioning system (GPS) device 705. Furthermore, the communication device 7 includes an audio input device 706, an audio output device 707, a display device 708, an imaging device 709, a connection device 710, a short-range wireless communication device 711, and a detection device 712. Note that the pieces of hardware constituting the communication device 7 are mutually connected via a bus 720.

The processor 701 serves as a control unit that controls the entire communication device 7, and includes various arithmetic devices such as a central processing unit (CPU). The processor 701 reads various programs on the memory 702 and executes the programs. Note that the processor 701 may include general-purpose computing on graphics processing units (GPGPU).

The memory 702 includes a main storage device such as a read only memory (ROM) and a random access memory (RAM). The processor 701 and the memory 702 configure a so-called computer. The processor 701 executes various programs read on the memory 702, and thus the computer implements various functions.

The auxiliary storage device 703 stores various programs and various types of information used when the various programs are executed by the processor 701.

The communication device 704 is a communication device for transmitting and receiving various types of information to and from other devices (including device, server, and system). The GPS device 705 detects position information of the communication device 7.

The audio input device 706 detects audio information such as user's voice and surrounding sound. The audio output device 707 is, for example, a device that audio-outputs various types of information and the like received from another device.

The display device 708 is, for example, a device that displays various types of information received from another device as an image.

The imaging device 709 images a user and surroundings and generates image information.

The connection device 710 is a connection device used for connecting various sensors, an external memory, and the like to the communication device 7.

The short-range wireless communication device 711 is a wireless device for performing short-range wireless communication with another device near the communication device 7.

The detection device 712 is a temperature sensor, a humidity sensor, an illuminance sensor, or the like.

Note that the communication device 7 does not necessarily have the configuration illustrated in FIG. 3. For example, the communication device 7 may not include the display device 708.

[Functional Configuration of Communication System]

Figure 4:
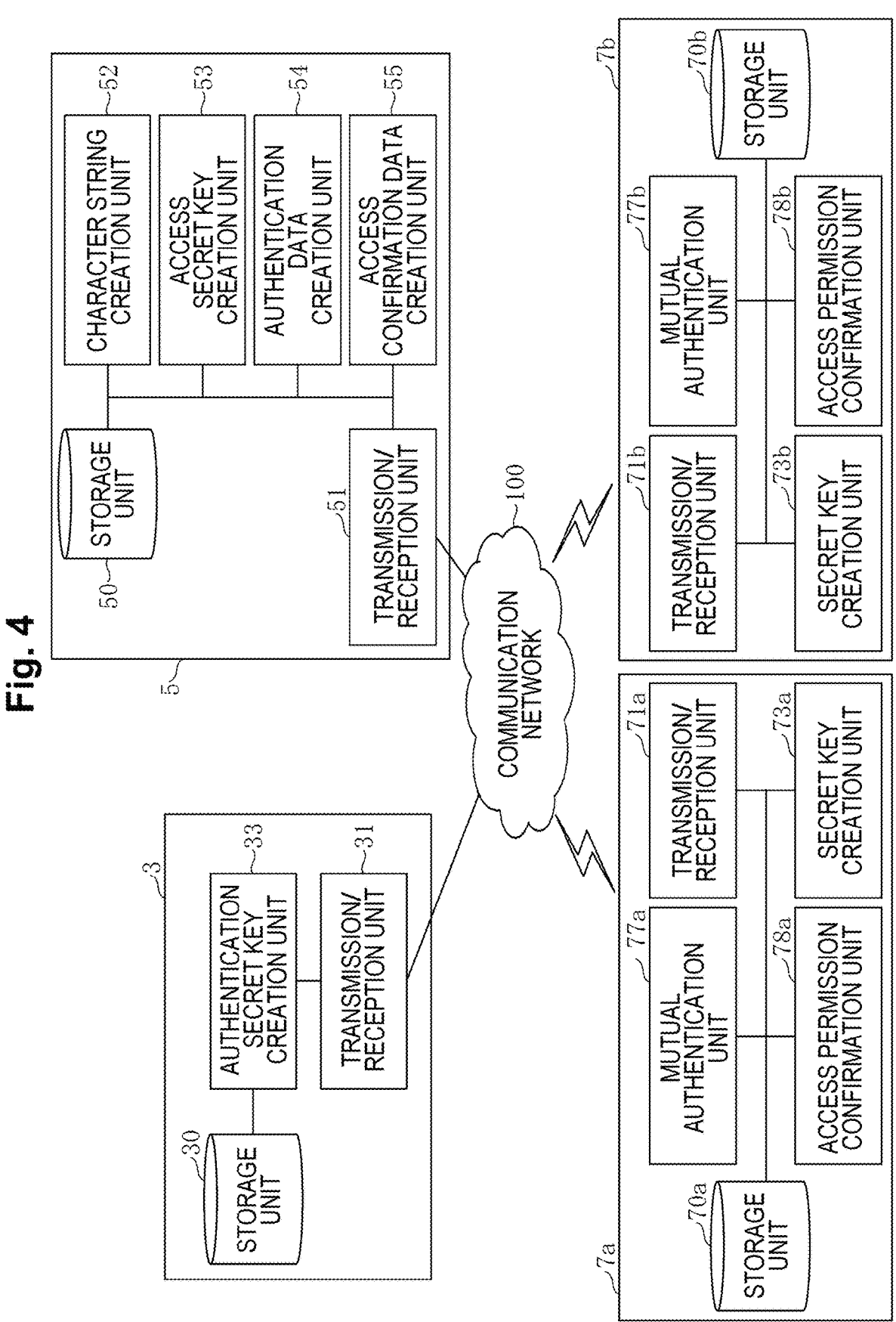
FIG. 4 is a functional configuration diagram of each system and each device of the communication system according to the embodiment.

Next, a functional configuration of the communication system will be described with reference to FIG. 4. FIG. 4 is a functional configuration diagram of each system and each device of the communication system according to the embodiment.

<Functional Configuration of Communication Data Utilization System 3>

The communication data utilization system 3 includes a transmission/reception unit 31 and an authentication secret key creation unit 33. These units are functions that the processor 301 causes the communication data utilization system 3 to implement by using one or more programs installed in the communication data utilization system 3. Further, the communication data utilization system 3 includes a storage unit 30. The storage unit 30 is realized by the memory 302 or the auxiliary storage device 303. The storage unit 30 stores a secret master secret key $z_b$.

The transmission/reception unit 31 transmits and receives data to and from other devices via the communication network 100.

The authentication secret key creation unit 33 uses the hash function $H_1$ ($H_2$) to generate the hash value $Q_{b1}$ ($Q_{b2}$) of a published authentication $ID_{b1}$ ($ID_{b2}$) of the communication device 7a (7b). In addition, the authentication secret key creation unit 33 creates the first authentication secret key $D_{b1}$ (second authentication secret key $D_{b2}$) by a product of the master secret key $z_b$ stored in the storage unit 30 and the hash value $Q_{b1}$ ($Q_{b2}$) of the authentication $ID_{b1}$ ($ID_{b2}$). Note that the hash function $H_1$ is an example of a first hash function, and the hash function $H_2$ is an example of a second hash function.

<Functional Configuration of Access Control System 5>

The access control system 5 includes a transmission/reception unit 51, a character string creation unit 52, an access secret key creation unit 53, an authentication data creation unit 54, and an access confirmation data creation unit 55. These units are functions that a processor 501 causes the access control system 5 to implement using one or more programs installed in the access control system 5. Further, the access control system 5 includes a storage unit 50. The storage unit 50 is realized by a memory 502 or an auxiliary storage device 503. The storage unit 50 stores a secret master secret key $z_a$.

The transmission/reception unit 51 transmits and receives data to and from other devices via the communication network 100.

The character string creation unit 52 creates the character string $S_a$ on the basis of access information including personal information and the like.

The access secret key creation unit 53 creates the access secret key s by generating a hash value of a logical sum of the character string $S_a$ and the master secret key $z_a$ stored in the storage unit 50 using a predetermined hash function $H_0$.

The authentication data creation unit 54 creates the first authentication data ($s \cdot Q_{b1}$) by generating the first hash value $Q_{b1}$ of the published first authentication $ID_{b1}$ of the communication device 7a using the first hash function $H_1$. ($s \cdot Q_{b1}$) is a value of a product of the access secret key s and the hash value $Q_{b1}$. Similarly, the authentication data creation unit 54 creates the second authentication data ($s \cdot Q_{b2}$) by generating the hash value $Q_{b2}$ of the published second authentication $ID_{b2}$ of the communication device 7b using the second hash function $H_2$. ($s \cdot Q_{b2}$) is a value of a product of the access secret key s and the hash value $Q_{b2}$.

The access confirmation data creation unit 55 creates access confirmation data ($s \cdot G_1$, $s \cdot G_2$) configured by a product of the access secret key s and the generation source $G_1$ of a subgroup in a group on a first elliptic curve, and a product of the access secret key s and the generation source $G_2$ of a subgroup in a group on a second elliptic curve.

<Functional Configuration of Communication Device 7a>

The communication device 7a includes a transmission/reception unit 71a, a secret key creation unit 73a, a mutual authentication unit 77a, and an access permission confirmation unit 78a. These units are functions that the processor 701 causes the communication device 7a to implement by using one or more programs installed in the communication device 7a. Furthermore, the communication device 7a includes a storage unit 70a. The storage unit 70a is realized by the memory 702 or the auxiliary storage device 703. The storage unit 70a stores a first authentication $ID_{b1}$ that is a public key of the communication device 7a. In addition, the storage unit 70a stores a first authentication secret key $D_{b1}$ that is a secret key paired with the first authentication $ID_{b1}$ and acquired from the communication data utilization system 3.

The transmission/reception unit 71a transmits and receives data to and from other devices via the communication network 100.

Based on the first authentication secret key $D_{b1}$ and the first authentication data ($s \cdot Q_{b1}$), the secret key creation unit 73a creates a first secret key Chi paired with the first authentication $ID_{b1}$ that is a public key.

The mutual authentication unit 77a performs mutual authentication with the communication device 7b using the first authentication $ID_{b1}$, the first secret key Chi, and the access confirmation data ($s \cdot G_1$, $s \cdot G_2$).

The access permission confirmation unit 78a confirms the access permission with the communication device 7b using the first authentication $ID_{b1}$, the first secret key $C_{b1}$, and the access confirmation data ($s \cdot G_1$, $s \cdot G_2$). In the present embodiment, unlike the case of Non Patent Literature 1, the mutual authentication unit 77a and the access permission confirmation unit 78a execute processing at the same timing.

<Functional Configuration of Communication Device 7b>

The communication device 7b includes a transmission/reception unit 71b, a secret key creation unit 73b, a mutual authentication unit 77b, and an access permission confirmation unit 78b. These units are functions that the processor 701 causes the communication device 7b to implement using one or more programs installed in the communication device 7b. Furthermore, the communication device 7b includes a storage unit 70b. The storage unit 70b is realized by the memory 702 or the auxiliary storage device 703. The storage unit 70b stores a second authentication $ID_{b2}$ that is a public key of communication device 7b. In addition, the storage unit 70b stores a second authentication secret key $D_{b2}$ that is a secret key paired with the second authentication $ID_{b2}$ and acquired from the communication data utilization system 3. The transmission/reception unit 71b transmits and receives data to and from other devices via the communication network 100.

Based on the second authentication secret key $D_{b2}$ and the second authentication data ($s \cdot Q_{b2}$), the secret key creation unit 73b creates a second secret key $C_{b2}$ paired with the second authentication $ID_{b2}$ that is a public key.

The mutual authentication unit 77b performs mutual authentication with the communication device 7a using the second authentication $ID_{b2}$, the second secret key $C_{b2}$, and the access confirmation data ($s \cdot G_1$, $s \cdot G_2$).

The access permission confirmation unit 78b confirms the access permission with the communication device 7a using the second authentication $ID_{b2}$, the second secret key $C_{b2}$, and the access confirmation data ($s \cdot G_1$, $s \cdot G_2$). In the present embodiment, unlike the case of Non Patent Literature 1, the mutual authentication unit 77b and the access permission confirmation unit 78b execute processing at the same timing.

Processing or Operation According to Embodiment

Next, processing or operation of the communication system 1 will be described with reference to FIGS. 5 to 11.

<Processing of Providing Authentication Secret Key>

Figure 5:
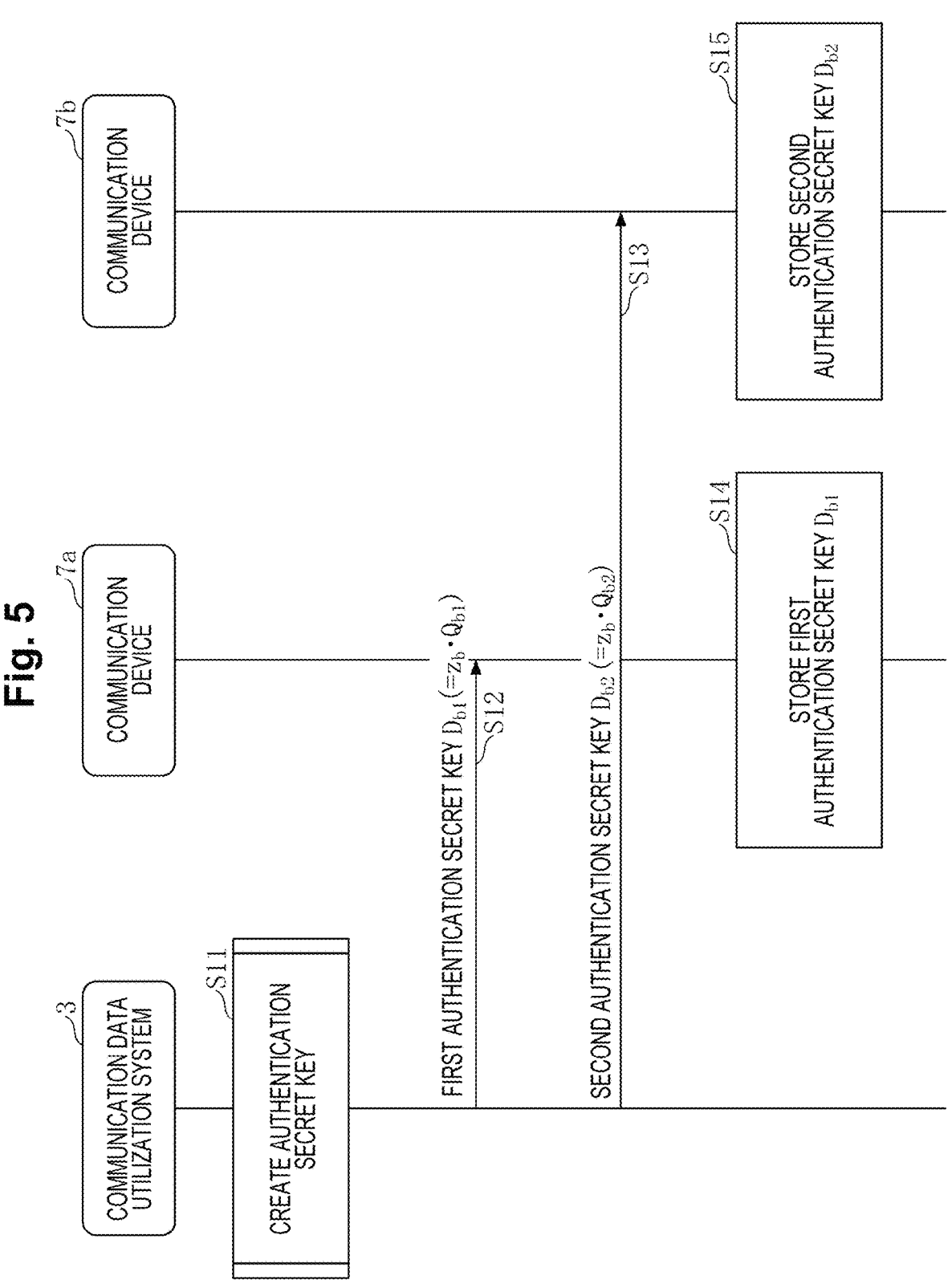
FIG. 5 is a sequence diagram illustrating processing of providing an authentication secret key from the communication data utilization system 3 to each of the communication devices 7a and 7b.

First, processing in which the communication data utilization system 3 provides the authentication secret key to each of the communication devices 7a and 7b will be described with reference to FIGS. 5 and 6. FIG. 5 is a sequence diagram illustrating a process of providing an authentication secret key from the communication data utilization system 3 to each of the communication devices 7a and 7b. FIG. 6 is a flowchart illustrating processing of creating an authentication secret key.

First, as illustrated in FIG. 5, the communication data utilization system 3 creates an authentication secret key of each communication device 7. Here, the processing of creating the authentication secret key will be described in detail with reference to FIG. 6.

As illustrated in FIG. 5, the communication data utilization system 3 creates an authentication secret key of each communication device 7 (S11). Here, the processing of creating the authentication secret key will be described in detail with reference to FIG. 6.

As illustrated in FIG. 6, the authentication secret key creation unit 33 uses the first hash function $H_1$ to generate the first hash value $Q_{b1}$ of the published first authentication $ID_{b1}$ of the communication device 7a (S111). Then, the authentication secret key creation unit 33 creates the first authentication secret key $D_{b1}$ by a product of the master secret key $z_b$ stored in the storage unit 30 and the first hash value $Q_{b1}$ (S112).

Next, the authentication secret key creation unit 33 uses the second hash function $H_2$ to generate the second hash value $Q_{b2}$ of the published second authentication $ID_{b2}$ of the communication device 7b (S113). Then, the authentication secret key creation unit 33 creates the second authentication secret key $D_{b2}$ by a product of the master secret key $z_b$ stored in the storage unit 30 and the second hash value $Q_{b2}$ (S114).

Next, referring back to FIG. 5, the transmission/reception unit 31 transmits the first authentication secret key $D_{b1}$ ($=z_b \cdot Q_{b1}$) to the communication device 7a (S12). Similarly, the transmission/reception unit 31 transmits the second authentication secret key $D_{b2}$ ($=z_b \cdot Q_{b2}$) to the communication device 7b (S13). As a result, the transmission/reception unit 71a of the communication device 7a receives the first authentication secret key Dpi and stores the first authentication secret key $D_{b1}$ in the storage unit 70a (S14). The transmission/reception unit 71b of the communication device 7b receives the second authentication secret key $D_{b2}$ and stores the second authentication secret key $D_{b2}$ in the storage unit 70b (S15).

As described above, each communication device 7 can acquire the authentication secret key of the each communication device 7.

<Mutual Authentication and Access Permission Confirmation>

Figure 7:
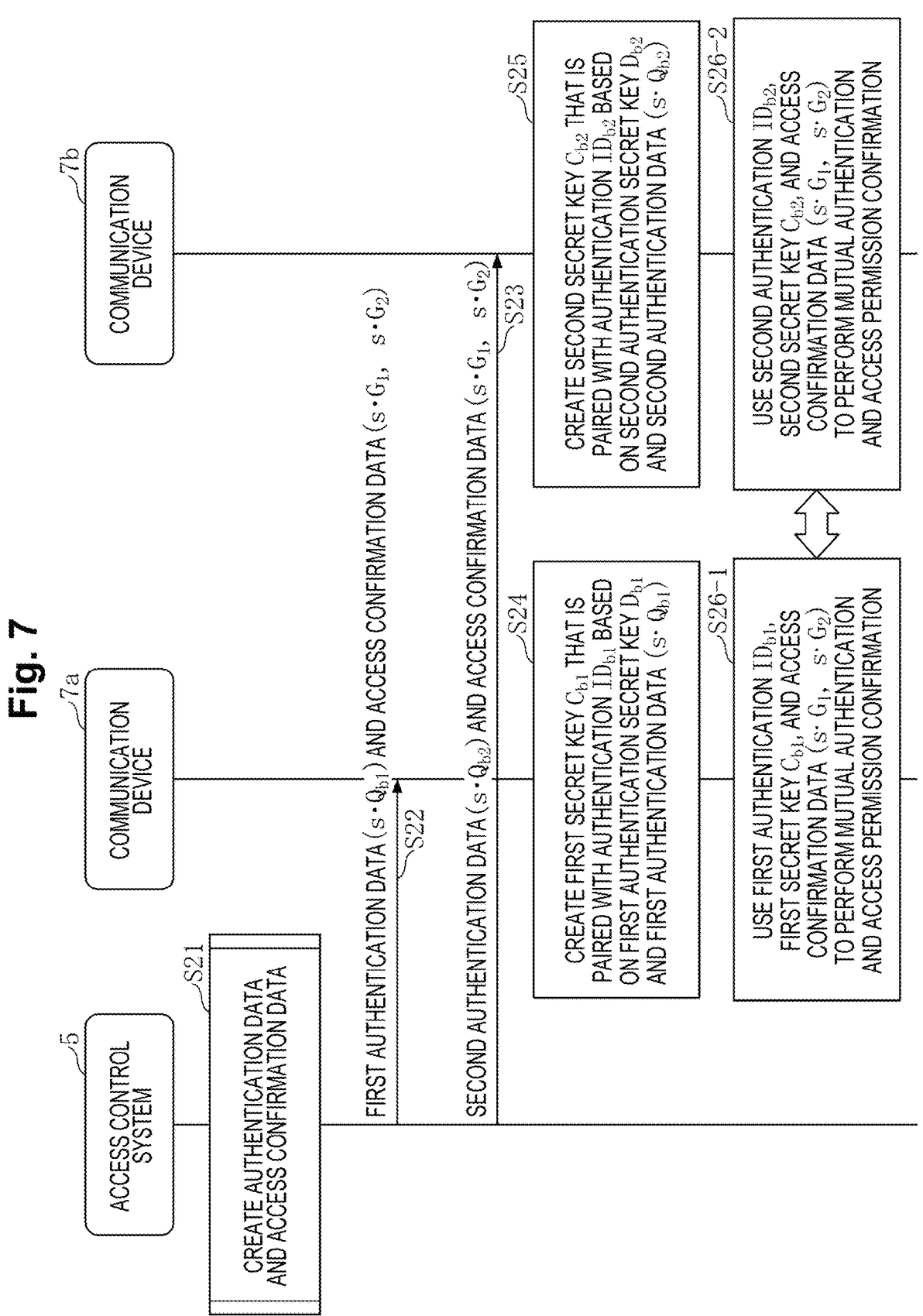
FIG. 7 is a sequence diagram illustrating a process in which the access control system 5 provides authentication data and access confirmation data to the communication devices 7a and 7b so that the communication devices 7a and 7b perform mutual authentication and access permission confirmation.

Next, a process in which the access control system 5 provides the communication devices 7a and 7b with the authentication data and the access confirmation data so that the communication device 7a and the communication device 7b perform mutual authentication and access permission confirmation will be described with reference to FIGS. 7 to 11. FIG. 7 is a sequence diagram illustrating a process in which the access control system 5 provides authentication data and access confirmation data to the communication devices 7a and 7b, so that the communication device 7a and the communication device 7b perform mutual authentication and access permission confirmation. FIG. 8 is a sequence diagram illustrating a process of creating authentication data and access confirmation data.

First, the access control system 5 creates the authentication data and the access confirmation data (S21). Here, the processing of creating the authentication data and the access confirmation data will be described in detail with reference to FIG. 8.

As illustrated in FIG. 8, the character string creation unit 52 creates character string $S_a$ based on the access information (S211). Note that, in a case where the access information is already represented by a character string such as "TARO Webcamera", the processing (S211) may be omitted. In this state, the third party can recognize the personal name and the like.

Next, the access secret key creation unit 53 creates the access secret key s by generating a hash value of a logical sum of the character string $S_a$ and the master secret key $z_a$ stored in the storage unit 50 using a predetermined hash function $H_0$ (S212).

Next, the authentication data creation unit 54 creates the first authentication data ($s \cdot Q_{b1}$) by generating the first hash value $Q_{b1}$ of the published first authentication $ID_{b1}$ of the communication device 7a using the first hash function $H_1$ (S213). Similarly, the authentication data creation unit 54 creates the second authentication data ($s \cdot Q_{b2}$) by generating the hash value $Q_{b2}$ of the published second authentication $ID_{b2}$ of the communication device 7b using the second hash function $H_2$ (S214).

Next, the access confirmation data creation unit 55 creates access confirmation data ($s \cdot G_1$, $s \cdot G_2$) configured by a product of the access secret key s and the generation source $G_1$ of the subgroup in the group on the first elliptic curve, and a product of the access secret key s and the generation source $G_2$ of the subgroup in the group on the second elliptic curve (S215).

Next, referring back to FIG. 7, the transmission/reception unit 51 transmits the first authentication data ($s \cdot Q_{b1}$) and the access confirmation data (s·G$_1$, s·G$_2$) to the communication device 7a (S22). As a result, the transmission/reception unit 71a of the communication device 7a receives the first authentication data (s·Q$_{b1}$) and the access confirmation data (s·G$_1$, s·G$_2$). Similarly, the transmission/reception unit 51 transmits the second authentication data (s·Q$_{b2}$) and the access confirmation data (s·G$_1$, s·G$_2$) to the communication device 7b (S23). As a result, the transmission/reception unit 71b of the communication device 7b receives the second authentication data (s·Q$_{b2}$) and the access confirmation data (s·G$_1$, s·G$_2$).

Next, in the communication device 7a, the secret key creation unit 73a creates the first secret key Chi that is paired with the first authentication ID$_{b1}$ that is a public key on the basis of the first authentication secret key D$_{b1}$ and the first authentication data (s·Q$_{b1}$) (S24). On the other hand, also in the communication device 7b, the secret key creation unit 73b creates the second secret key C$_{b2}$ that is paired with the second authentication ID$_{b2}$ that is a public key on the basis of the second authentication secret key D$_{b2}$ and the second authentication data (s·Q$_{b2}$) (S25).

Then, the mutual authentication unit 77a of the communication device 7a uses a first authentication ID1, the first secret key C$_{b1}$, and the access confirmation data (s·G$_1$, s·G$_2$), and the mutual authentication unit 77b of the communication device 7b uses a second authentication ID2, the second secret key C$_{b2}$, and the access confirmation data (s·G$_1$, s·G$_2$), thereby performing processing in which a part of the protocol of the mutual authentication (FSU) using the existing ID-based encryption technology is changed (S26-1, 2). Further, with a partial change in the protocol of the FSU, the access permission confirmation unit 78a uses the first authentication ID1, the first secret key C$_{b1}$, and the first access confirmation data (s·G$_1$, s·G$_2$), and the access permission confirmation unit 78b uses the second authentication ID2, the second secret key C$_{b2}$, and the second access confirmation data (s·G$_1$, s·G$_2$), thereby confirming the access permission at the same timing as the mutual authentication.

Mutual authentication (FSU) using an ID-based encryption technology is disclosed in Non Patent Literature 1. FIG. 9 is a diagram illustrating a protocol of an FSU disclosed in Non Patent Literature 1. FIG. 10 is a diagram for explaining each character in FIG. 9. In FIG. 9, IDA corresponds to the first authentication ID$_{b1}$ of the communication device 7a, and ID$_{b1}$ corresponds to the second authentication ID$_{b2}$ of the communication device 7b.

FIG. 11 is a diagram illustrating a change content of a part of the protocol of the FSU of FIG. 9. The left side of FIG. 11 illustrates a protocol of mutual authentication (FSU) using the ID-based encryption technology disclosed in Non Patent Literature 1, and the right side of FIG. 11 illustrates a change content of a part of the protocol of the FSU. As described above, the changed protocol includes the access secret key s in which the character string S$_a$ is in the secret state.

As described above, the access control system 5 creates the access secret key s in which the character string S$_a$ is embedded in order to conceal the character string S$_a$ of the access information (see S212), and later, the communication devices 7a and 7b perform processing by changing a part of the protocol of the FSU illustrated in FIG. 11, thereby simultaneously confirming the access permission at the time of mutual authentication.

Main Advantageous Effects of Embodiment

As described above, according to the present embodiment, there is an effect that access targets (communication device 7a, 7b) can be made accessible to each other in a state where access information is concealed.

[Supplements]

The present invention is not limited to the above-described embodiment, and the following configuration or processing (operation) may be used.

The communication data utilization system 3, the access control system 5, and the communication device 7 can also be realized by a computer and a program, but the program can be recorded in a (non-transitory) recording medium or provided through a network such as the Internet.

REFERENCE SIGNS LIST

1 Communication system
3 Communication data utilization system
5 Access control system
7a Communication device (example of first communication device)
7b Communication device (example of second communication device)
51 Transmission/reception unit (example of transmission unit)
52 Character string creation unit
53 Access secret key creation unit
54 Authentication data creation unit
55 Access confirmation data creation unit
71a Transmission/reception unit
71b Transmission/reception unit
73a Secret key creation unit (example of first secret key creation unit)
73b Secret key creation unit (example of second secret key creation unit)
77a Mutual authentication unit (example of first mutual authentication unit)
77b Mutual authentication unit (example of second mutual authentication unit)
78a Access permission confirmation unit (example of first access permission confirmation unit)
78b Access permission confirmation unit (example of second access permission confirmation unit)
100 Communication network

The invention claimed is:

1. An access-control-purpose system that provides access information of first and second communication devices to the first and second communication devices that perform mutual authentication using ID-based encryption, the access-control-purpose system comprising:

a processor; and a memory that includes instructions, which when executed, cause the processor to execute:

creating an access secret key by generating a hash value of a logical sum of a character string according to access information and a master secret key;

creating first authentication data by generating a hash value of a first authentication ID for the first communication device by using a first hash function, and creating second authentication data by generating a hash value of a second authentication ID for the second communication device by using a second hash function;

creating access confirmation data configured by a product of the access secret key and a generation source of a subgroup in a group on a first elliptic curve, and a product of the access secret key and a generation source of a subgroup in a group on a second elliptic curve; and transmitting the first authentication data and the access confirmation data to the first communication device, and transmitting the second authentication data and the access confirmation data to the second communication device.

2. The access-control-purpose system according to claim 1, wherein the instructions, which when executed, cause the processor to execute:

creating the character string based on the access information.

3. A communication system comprising:

the access-control-purpose system according to claim 1;

the first communication device; and the second communication device.

4. The communication system according to claim 3, wherein the instructions, which when executed, cause the processor to execute:

creating, by the first communication device, a first secret key paired with a first authentication ID that is a public key on the basis of a first authentication secret key for the first communication device and the first authentication data;

performing, by the first communication device, mutual authentication with the second communication device by using the first authentication ID, the first secret key, and the access confirmation data; and performing, by the first communication device, confirmation of an access permission with the second communication device using the first authentication ID, the first secret key, and the access confirmation data, creating, by the second communication device, a second secret key paired with a second authentication ID that is a public key on the basis of a second authentication secret key for the second communication device and the second authentication data;

performing, by the second communication device, mutual authentication with the first communication device by using the second authentication ID, the second secret key, and the access confirmation data; and performing, by the second communication device, confirmation of the access permission with the first communication device using the second authentication ID, the second secret key, and the access confirmation data.

5. The communication system according to claim 4, wherein the instructions, which when executed, cause the processor to execute:

processing by the first mutual authentication unit and the first access permission confirmation unit at the same timing, and processing by the second mutual authentication unit and the second access permission confirmation unit at the same timing.

6. An access control method executed by an access-control-purpose system that provides access information of first and second communication devices to the first and second communication devices that perform mutual authentication using ID-based encryption, the access control method comprising:

by the access-control-purpose system, creating an access secret key by generating a hash value of a logical sum of a character string according to the access information and a master secret key;

creating first authentication data by generating a hash value of a first authentication ID for the first communication device using a first hash function, and creating second authentication data by generating a hash value of a second authentication ID for the second communication device using a second hash function;

creating access confirmation data configured by a product of the access secret key and a generation source of a subgroup in a group on a first elliptic curve, and a product of the access secret key and a generation source of a subgroup in a group on a second elliptic curve; and transmitting the first authentication data and the access confirmation data to the first communication device, and transmitting the second authentication data and the access confirmation data to the second communication device.

7. A non-transitory computer-readable recording medium having computer-readable instructions stored thereon, which when executed, cause a computer including a memory and a processor to execute the method according to claim 6.

* * * * *